United States Patent [19]

Sylvester et al.

[11] 4,216,121

[45] Aug. 5, 1980

[54] CATALYST, ITS PREPARATION AND USE IN THE POLYMERIZATION OF BUTADIENE

[75] Inventors: Gerd Sylvester, Leverkusen; Manfred Beck, Odenthal; Josef Witte, Cologne; Gottfried Pampus, Leverkusen, all of Fed. Rep. of Germany

[73] Assignee: Bayer Aktiengesellschaft, Fed. Rep. of Germany

[21] Appl. No.: 5,445

[22] Filed: Jan. 22, 1979

[30] Foreign Application Priority Data

Jan. 25, 1978 [DE] Fed. Rep. of Germany ....... 2803095

[51] Int. Cl.² .................................................. C08F 4/64
[52] U.S. Cl. ............................. 252/431 C; 252/429 C; 252/431 R; 526/119
[58] Field of Search ............ 252/429 C, 431 R, 431 C

[56] References Cited

U.S. PATENT DOCUMENTS

| | | | |
|---|---|---|---|
| 2,986,531 | 5/1961 | Schreyer | 252/429 C |
| 3,205,212 | 9/1965 | Naylor et al. | 252/429 C X |
| 3,463,743 | 8/1969 | Durst et al. | 252/429 C X |

*Primary Examiner*—Patrick Garvin
*Attorney, Agent, or Firm*—Connolly and Hutz

[57] ABSTRACT

A catalyst composition comprising (a) $TiI_4$ and/or $TiOR^1I_3$, (b) $AlR_3$ and/or $HAlR_2$ and (c) $TiXCl_3$ can be used for polymerizing butadiene. Said catalyst can be obtained by mixing the components a, b and c in any order at temperatures from $-10°$ to $+80°$ C. $R'$ represents $C_{1-8}$ alkyl and X represents a $C_{1-12}$ alkoxy radical optionally substituted one or more times by halogen, $C_6$ or $C_7$ cycloalkyl and/or phenyl, a $C_{5-7}$ cycloalkoxy radical optionally substituted one or more times by $C_{1-5}$ alkyl groups, a phenoxy group corresponding to the formula

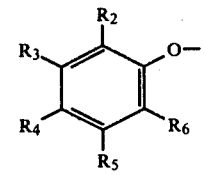

wherein $R_2$ and $R_6$ can be the same or different and are hydrogen or $C_{1-5}$ alkyl, a carboxyl group having the formula $R^7$—COO wherein $R^7$ is $C_{1-12}$ alkyl optionally substituted one or more times by halogen, $C_{5-7}$ cycloalkyl and/or phenyl, a $C_{5-7}$ cycloalkyl radical optionally substituted one or more times by $C_{1-5}$ alkyl groups, or phenyl.

5 Claims, No Drawings

CATALYST, ITS PREPARATION AND USE IN THE POLYMERIZATION OF BUTADIENE

This invention relates to a catalyst, the preparation thereof and the use thereof in the polymerisation of butadiene.

The catalyst according to the present invention contains:

(a) $TiI_4$ and/or $TiOR^1I_3$, wherein $R^1$ represents $C_1$–$C_8$, preferably $C_2$ or $C_3$, alkyl;

(b) $AlR_3$ and/or $HAlR_2$, wherein R represents $C_1$–$C_8$, preferably $C_2$–$C_4$, alkyl;

(c) $TiXCl_3$, wherein X represents $C_1$–$C_{12}$ alkoxy which is optionally substituted one or more times, for example from 2 to 5 times, by chlorine, bromine, iodine, $C_6$ or $C_7$ cycloalkyl or phenyl;

a $C_5$–$C_7$ cycloalkoxy radical which is optionally substituted one or more times, for example from 2 to 5 times, by $C_1$–$C_5$ alkyl, a phenoxy group corresponding to the following general formula

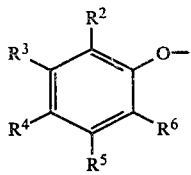

wherein $R_2$ to $R_6$, which may be the same or different, each represents hydrogen or $C_1$–$C_5$ alkyl, a carboxyl group corresponding to the following general formula: $R^7$—COO— wherein $R^7$ represents $C_1$–$C_{12}$ alkyl which is optionally substituted one or more times, for example from 2 to 5 times, by chlorine, bromine, iodine, $C_5$–$C_7$ cycloalkyl and/or phenyl; a $C_5$–$C_7$ cycloalkyl radical which is optionally substituted one or more times, for example from 2 to 5 times, by $C_1$–$C_5$ alkyl, or phenyl.

The molar ratio of the $TiXCl_3$ compound (c) to the $TiI_4$ or $Ti(OR^1)I_3$ compound (a) generally amounts to from 0.1:1 to 1:1, preferably from 0.2:1 to 0.6:1. The quantity in which the aluminum alkyl compound (b) is used is selected in such a way that the molar ratio of the aluminum compound (b) to the sum of the titanium compounds (c) and (a) generally amounts to from 2:1 to 5:1, preferably from 2:1 to 3.5:1.

The following compounds are mentioned as examples of component (a) of the catalyst: methoxy titanium triiodide, ethoxy titanium triiodide, n-propoxy titanium triiodide, i-propoxy titanium triiodide, n-butoxy titanium triiodide and titanium tetraiodide. It is preferred to use ethoxy titanium triiodide.

Examples of component (c) include methoxy titanium trichloride, ethoxy titanium trichloride, n-propoxy titanium trichloride, i-propoxy titanium trichloride, n-butoxy titanium trichloride, i-butoxy titanium trichloride, β-chloroethoxy titanium trichloride, cyclohexyl methoxy titanium trichloride, phenolatotitanium trichloride, di-t-butyl phenolatotitanium trichloride, trichloroethoxy titanium trichloride, methyl-di-t-butyl phenolatotitanium trichloride, 2-ethylhexanoatotitanium trichloride and benzoatotitanium trichloride.

Examples of component (b) include: trimethyl aluminium, triethyl aluminium, trioctyl aluminium and diethyl aluminium hydride. It is preferred to use triethyl aluminium.

Preparation of the catalysts according to the present invention is carried out in the absence of air and moisture in aliphatic or cycloaliphatic hydrocarbons at temperatures of from $-10°$ to $+80°$ C. by reacting components (a), (b) and (c), the individual components being added in any order. In one preferred procedure for preparing the catalysts, the reaction of catalyst components (a), (b) and (c) is carried out in the presence of the monomer to be polymerised in the presence of the catalyst. It is particularly preferred initially to add the titanium components (a) and (c) to a solution of the monomer(s) to be polymerised in aliphatic or cycloaliphatic hydrocarbons and then to add the aluminium component (b).

The catalyst according to the present invention may be used, for example, in the polymerisation of butadiene.

Various titanium- and iodine-containing catalyst systems have been described for the polymerisation of butadiene in solution to form polymers having a high content of cis-1,4-bonds. According to the teaching of DE-AS Nos. 1,190,441 and 1,242,371, one particularly active system is obtained from titanium alkoxy triiodides and titanium tetrachloride in combination with aluminium alkyls. In aromatic solvents, particularly benzene, this system gives butadiene polymers having excellent rubber properties in outstanding volume/time yields. However, there is considerable commercial interest in being able to carry out the polymerisation of butadiene using titanium alkoxy triiodides in non-aromatic solvents, particularly in aliphatic or cycloaliphatic solvents. In these non-aromatic solvents, the known titanium catalyst systems show greatly reduced activity. Thus, to obtain comparable volume/time yields, it would be necessary to use several times the quantity of catalyst. Although, in principle, it would be possible to increase the velocity of the reaction by increasing the reaction temperature, the cis-1,4-unit content of the polymer decreases in this case, leading to poor quality products.

The catalysts according to the present invention show greatly increased activity in aliphatic and cycloaliphatic solvents by comparison with catalysts which do not contain the component (c) $TiXCl_3$. In addition, the very high molecular weight of the polybutadiene obtained using a low concentration of catalyst is reduced by the catalyst component $TiXCl_3$ to a level which, technically, is extremely desirable. The major advantage of the catalysts according to the present invention lies in the fact that, at polymerisation temperatures of up to 80° C. where the highest conversions and commercially useful molecular weights are obtained, the polymerisation reaction undergoes only a slight loss in stereospecificity.

The polymerisation of butadiene using the catalysts according to the present invention is carried out by a known process in the absence of air and moisture at a temperature of from 0° to 80° C. The solvents used are aliphatic or cycloaliphatic hydrocarbons, for example pentane, hexane, heptane or, preferably, cyclohexane.

The initial monomer concentration generally amounts to from 5 to 30% by weight, preferably from 10 to 25%, by weight.

The catalysts are generally used in such quantities that from 0.05 to 0.4 mMole, preferably from 0.1 to 0.3 mMole, of (a) are used per 100 g of butadiene. The reaction begins after a short time, as reflected in an increase in the viscosity of the solution.

Generally, on completion of the polymerisation reaction, the organometallic catalyst is deactivated in the conventional way by the addition of amines, alcohols or carboxylic acids. Following the addition of an anti-oxidant, for example 2,6-di-t-butyl-4-methyl phenol, the polybutadiene is isolated from the solution by precipitation using a non-solvent, such as ethanol or isopropanol, or by steam distillation of the solvent. The rubber is dried in a drying cabinet or in a screw machine.

The entire process, namely polymerisation and working-up, may be carried out continuously or in batches. The polybutadiene produced by the process according to the present invention has a cis-1,4-double bond content of from 90 to 95%. The polymers obtained may be processed either on their own or as mixtures with other elastomers to form products having outstanding technological properties. They are particularly suitable for the production of car tyres and industrial rubber articles.

EXAMPLES 1 TO 7

290 ml of dry cyclohexane were introduced together with nitrogen into a 500 ml capacity nitrogen-purged glass flask. Nitrogen was then introduced into the liquid for another 2 minutes, after which the flask was hermetically sealed using a rubber plug and a crown cork of metal provided with bores for the introduction of injection needles. From a cylinder of butadiene, approximately 50 g of liquid monomer was introduced into the flask by means of an injection needle. Solutions or suspensions of the catalyst components were then added to the solvent/monomer mixture in the order $Ti(OC_2H_5)I_3$—$TiXCl_3$—$Al(C_2H_5)_3$ by syringes which were also provided with injection needles, the flask being shaken after each addition.

The flask containing the reaction mixture was left standing for 2 hours at room temperature. Thereafter, the flask was opened and the polymer precipitated using 0.5 liter of ethanol containing 0.5% by wt. of an antioxidant. The coagulated polybutadiene was dried in vacuo at 50° C. to constant weight. The microstructure was confirmed by infrared spectroscopy. The inherent viscosity ($\eta\text{inh} = \ln \eta r/c$) was measured using a 0.5% by weight solution of the polymer in toluene.

Table 1

| Example No. | $Ti(OC_2H_5)I_3$ [mMole] | $TiXCl_3$ [mMole] | X |
|---|---|---|---|
| Comparison Example | 0.1 | 0.06 | Cl |
| 1 | 0.1 | 0.06 | $OC_2H_5$ |
| 2 | 0.1 | 0.06 | O—n—$C_3H_7$ |
| 3 | 0.1 | 0.06 | O—n—$C_4H_9$ |
| 4 | 0.1 | 0.06 | $OCH_2C(CH_3)_3$ |
| 5 | 0.1 | 0.06 | $OCH_2C_6H_{11}$ |
| 6 | 0.1 | 0.06 | $OCH_2CH_2CH_2Cl$ |
| 7 | 0.1 | 0.06 | $C_7H_{15}$; $CO_2$ |

| Example No. | $Al(C_2H_5)_3$ [mMole] | Conversion [%] | $\ln \eta r/c$ | cis-1,4- [%] |
|---|---|---|---|---|
| Comparison Example | 0.4 | 63 | 1.61 | 88.3 |
| 1 | 0.4 | 73 | 1.60 | 91.5 |
| 2 | 0.4 | 70 | 1.72 | 92.3 |
| 3 | 0.4 | 84 | 1.77 | 91.8 |
| 4 | 0.4 | 67 | 2.03 | 93.1 |
| 5 | 0.4 | 81 | 1.93 | 91.8 |
| 6 | 0.4 | 76 | 2.22 | 92.5 |
| 7 | 0.4 | 72 | 1.95 | 93.6 |

EXAMPLES 8 TO 13

The polymerisation reaction was carried out in a 40 liter capacity dry, nitrogen-purged stirrer-equipped vessel surrounded by a cooling jacket. 18 kg of cyclohexane and then 2 kg of butadiene were introduced into this vessel. After the required reaction temperature had been adjusted, the catalyst components dissolved in cyclohexane were added in the order titanium ethoxy triiodide—titanium ethoxy trichloride—triethyl aluminium. Finally, another 2 kg of butadiene were introduced. After a reaction time of 2 hours, the catalyst was deactivated using a mixture of cyclohexane and ethanol to which 0.3% of 2,6-di-t-butyl-4-methyl phenol (based on solid polymer) had been added. The polybutadiene was recovered by removing the cyclohexane by steam distillation, followed by drying at 50° C. in a vacuum drying cabinet.

The catalyst concentrations, reaction conditions, conversions and product properties (ML-4'/100° C., cis-1,4-content) are set out in Table 2.

Table 2

| No. | $Ti(OC_2H_5)I_3$ [mMole] | $Ti(OC_2H_5)Cl_3$ [mMole] | $Al(C_3H_5)_3$ [mMole] |
|---|---|---|---|
| 8 | 6.0 | 4.0 | 30.0 |
| 9 | 6.0 | 4.0 | 30.0 |
| 10 | 6.0 | 3.0 | 22.5 |
| 11 | 6.0 | 2.5 | 25 |
| 12 | 6.0 | 2.5 | 25 |
| 13 | 6.0 | 2.5 | 25 |

| No. | Temp. [°C.] | Conversion [%] | cis-1,4- [%] | Mooney viscosity (ML-4'/100°C.) |
|---|---|---|---|---|
| 8 | 40 | 64 | 93.1 | 46 |
| 9 | 45 | 73 | 93.2 | 37 |
| 10 | 50 | 83 | 92.7 | 39 |
| 11 | 55 | 82 | 93.3 | 48 |
| 12 | 60 | 85 | 92.0 | 35 |
| 13 | 80 | 100 | 92.4 | 69 |

EXAMPLE 14

As described in Examples 1 to 7, 290 ml of cyclohexane, 0.1 mMole of titanium ethoxy triiodide, 0.06 mMole of titanium isobutoxy trichloride, 0.4 mMole of triethyl aluminium and, after 20 minutes, 50 g of butadiene were introduced into a 500 ml glass flask. After standing for 2 hours at 25° C., the polymer solution was worked-up in the same way as described in Examples 1 to 7.

Determination of the microstructure by infrared spectroscopy produced the following results:
93.8% cis-1,4;
2.1% trans-1,4- and
4.1% 1,2-double bonds
In $\eta r/c = 2.25$.

What is claimed is:
1. A catalyst composition which comprises
   (a) $TiI_4$ and/or $TiOR^1I_3$, wherein $R^1$ represents a straight- or branched-chain $C_1$–$C_8$ alkyl radical;
   (b) $AlR_3$ and/or $HAlR_2$, wherein R represents a straight- or branched-chain $C_1$–$C_8$ alkyl radical;
   (c) $TiXCl_3$, wherein X represents a straight- or branched-chain $C_1$–$C_{12}$ alkoxy radical which is optionally substituted one or more times by halo- gen, $C_6$ or $C_7$ cycloalkyl and/or phenyl; a $C_5$–$C_7$ cycloalkoxy radical which is optionally substituted one or more times by $C_1$–$C_5$ alkyl groups; a phenoxy group corresponding to the formula:

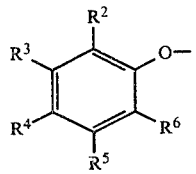

wherein $R^2$ to $R^6$, which may be the same or different, each represents hydrogen or a straight- or branched-chain $C_1$–$C_5$ alkyl radical; a carboxyl group corresponding to the formula $R^7$—COO wherein $R^7$ represents a straight- or branched-chain $C_1$–$C_{12}$ alkyl radical which is optionally substituted one or more times by halogen, $C_5$–$C_7$ cycloalkyl and/or phenyl; a $C_5$–$C_7$ cycloalkyl radical which is optionally substituted one or more times by $C_1$–$C_5$ alkyl groups; or phenyl, said composition containing components (a) and (c) in a molar ratio of (c) to (a) of from 0.1:1 to 1:1 and containing component (b) in a molar ratio of (b) to the sum of (a) and (c) of from 2:1 to 5:1.

2. A catalyst, as claimed in claim 1, comprising:
(a) methoxy titanium triiodide,
   ethoxy titanium triiodide,
   n-propoxy titanium triiodide,
   i-propoxy titanium triiodide,
   n-butoxy titanium triiodide or
   titanium tetraiodide;
(b) trimethyl aluminium,
   triethyl aluminium,
   trioctyl aluminium or
   diethyl aluminium hydride;
   and
(c) methoxy titanium trichloride,
   ethoxy titanium trichloride,
   n-propoxy titanium trichloride,
   i-propoxy titanium trichloride,
   n-butoxy titanium trichloride,
   i-butoxy titanium trichloride,
   β-chloroethoxy titanium trichloride,
   cyclohexyl methoxy titanium trichloride,
   phenolatotitanium trichloride,
   di-t-butyl phenolatotitanium trichloride,
   trichloroethoxy titanium trichloride,
   methyl di-t-butyl phenolatotitanium trichloride,
   2-ethyl hexanoatotitanium trichloride or
   benzoatotitanium trichloride.

3. A catalyst, as claimed in claim 1, comprising:
(a) ethoxy titanium triiodide;
(b) triethyl aluminium; and
(c) methoxy titanium trichloride,
   ethoxy titanium trichloride,
   n-propoxy titanium trichloride,
   i-propoxy titanium trichloride,
   n-butoxy titanium trichloride,
   i-butoxy titanium trichloride,
   β-chloroethoxy titanium trichloride,
   cyclohexyl methoxy titanium trichloride,
   phenolatotitanium trichloride,
   di-t-butyl phenolatotitanium trichloride,
   trichloroethoxy titanium trichloride,
   methyl-di-t-butyl phenolatotitanium trichloride,
   2-ethyl hexanoatotitanium trichloride or
   benzoato titanium trichloride.

4. A catalyst as claimed in claim 1 containing components (a) and (c) in a molar ratio of (c) to (a) of from 0.2:1 to 0.6:1 and containing component (b) to the sum of (a) and (c) in a molar ratio of (b) to the sum of (a) and (c) of from 2:1 to 3.5:1.

5. A process for the production of the catalysts claimed in claim 1, characterised in that components (a), (b) and (c) are reacted in any order in the absence of air and moisture in an aliphatic or cycloaliphatic hydrocarbon at a temperature of from −10° to +80° C. in the presence or absence of the monomer.

* * * * *